United States Patent
Ordasi

(10) Patent No.: US 10,756,619 B2
(45) Date of Patent: Aug. 25, 2020

(54) MOSFET DEAD TIME OPTIMIZATION FOR AN ELECTRIC MOTOR OF A STEERING MECHANISM OF A MOTOR VEHICLE

(71) Applicants: THYSSENKRUPP PRESTA AG, Eschen (LI); thyssenkrupp AG, Essen (DE)

(72) Inventor: Gabor Ordasi, Diosd (HU)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 0 days.

(21) Appl. No.: 16/327,890

(22) PCT Filed: Aug. 26, 2016

(86) PCT No.: PCT/EP2016/070189
§ 371 (c)(1),
(2) Date: Feb. 25, 2019

(87) PCT Pub. No.: WO2018/036637
PCT Pub. Date: Mar. 1, 2018

(65) Prior Publication Data
US 2019/0207511 A1    Jul. 4, 2019

(51) Int. Cl.
*H02M 1/38* (2007.01)
*H02P 27/08* (2006.01)
(Continued)

(52) U.S. Cl.
CPC ............ *H02M 1/38* (2013.01); *B62D 5/046* (2013.01); *B62D 5/0463* (2013.01);
(Continued)

(58) Field of Classification Search
CPC .................................... B62D 5/04; B62D 6/00
See application file for complete search history.

(56) References Cited

U.S. PATENT DOCUMENTS

| 6,535,402 B1 | 3/2003 | Ying |
| 6,798,161 B2* | 9/2004 | Suzuki ................ B62D 5/0487 180/443 |

(Continued)

FOREIGN PATENT DOCUMENTS

| DE | 10 2014 113 168 A | 3/2015 |
| EP | 1 359 663 A | 11/2003 |
| EP | 2 846 447 A | 3/2015 |

OTHER PUBLICATIONS

English Translation of International Search Report issued in PCT/EP2016/070189, dated May 23, 2017.

*Primary Examiner* — Bentsu Ro
(74) *Attorney, Agent, or Firm* — thyssenkrupp North America, LLC

(57) ABSTRACT

A method for dead time optimization of MOSFETs in an inverter of an motor controller of an electric motor in an electromechanical motor vehicle power steering mechanism or a steer-by-wire system. The inverter includes at least two MOSFETs comprising a high side MOSFET and a low side MOSFET, and wherein the motor controller controls the at least two MOSFETS with gate driver signals with a dead time. The dead time represents a time of the MOSFETs for switching over from one MOSFET to another MOSFET connected in series. The method includes the steps of measuring a cross conduction between the high side MOSFET and the low side MOSFET in a current measurement unit, and when a cross conduction occurs the dead time is increased, otherwise the dead time is decreased.

13 Claims, 4 Drawing Sheets

Figure 1:
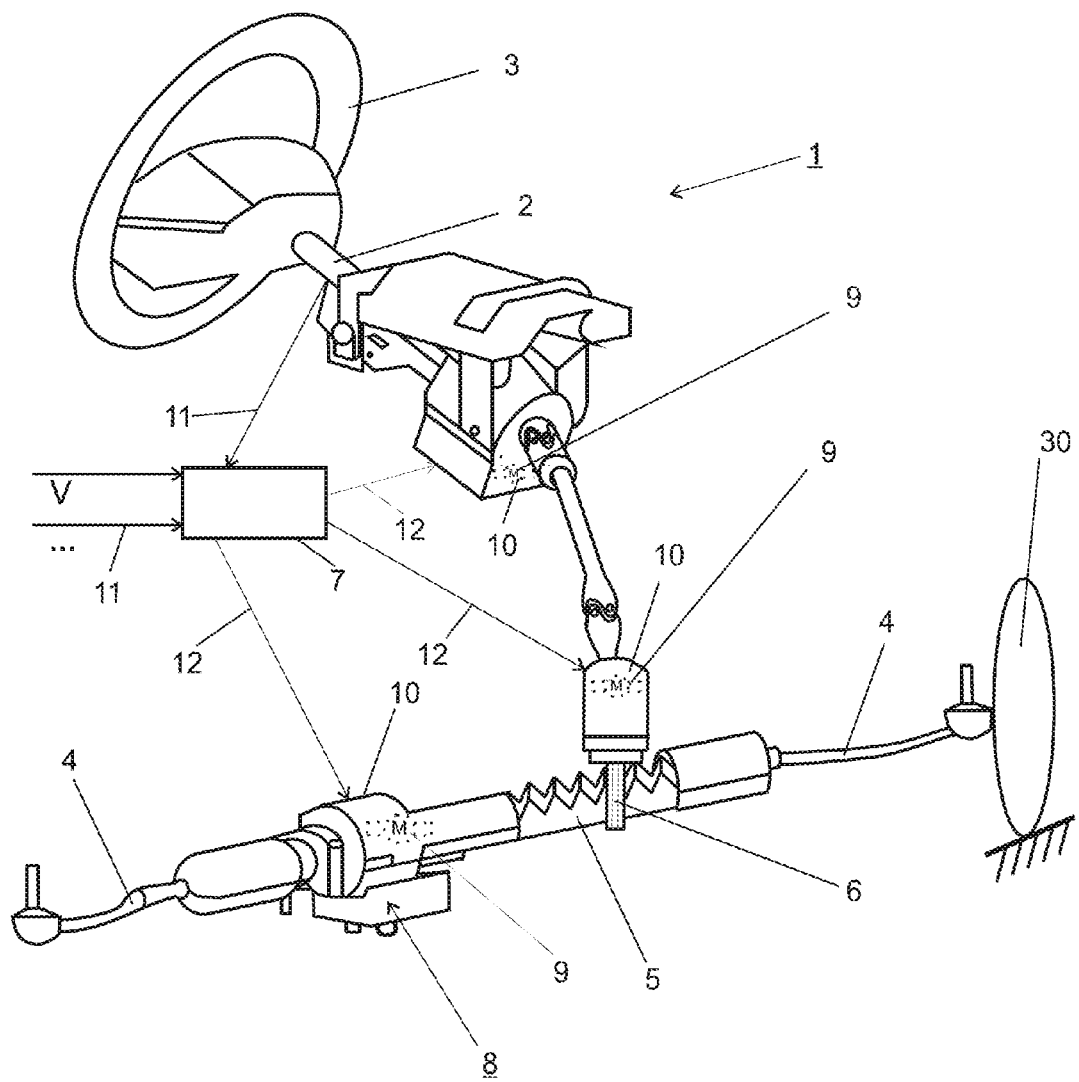

(51) Int. Cl.
*B62D 5/04* (2006.01)
*H02M 7/5387* (2007.01)
*H02M 1/00* (2006.01)

(52) U.S. Cl.
CPC ........ *H02M 7/53871* (2013.01); *H02P 27/08* (2013.01); *H02M 2001/0009* (2013.01); *H02M 2007/53878* (2013.01)

(56) References Cited

U.S. PATENT DOCUMENTS

| | | | |
|---|---|---|---|
| 2005/0146311 A1 | 7/2005 | Kuo | |
| 2013/0066524 A1* | 3/2013 | Kitazume | B62D 6/00 701/42 |
| 2019/0168801 A1* | 6/2019 | Takase | B62D 5/0463 |

* cited by examiner

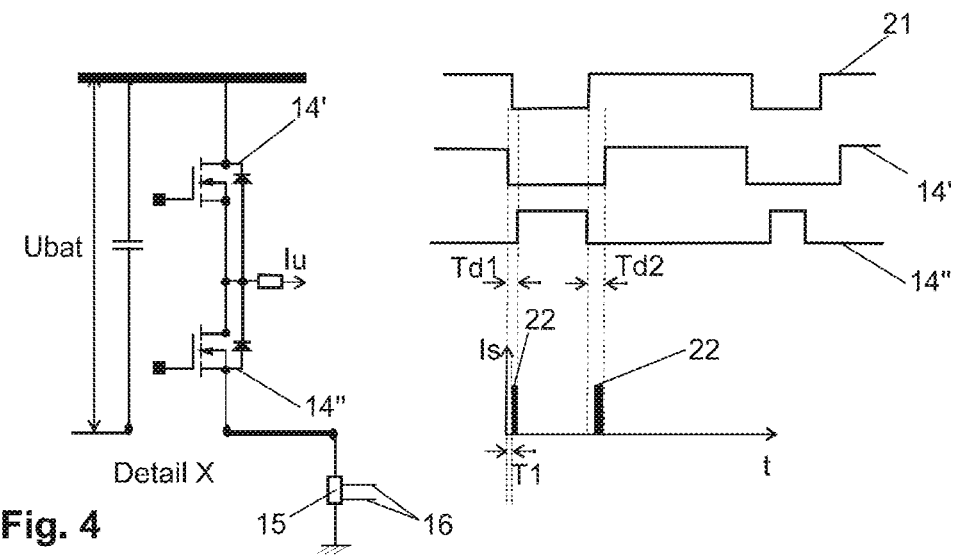
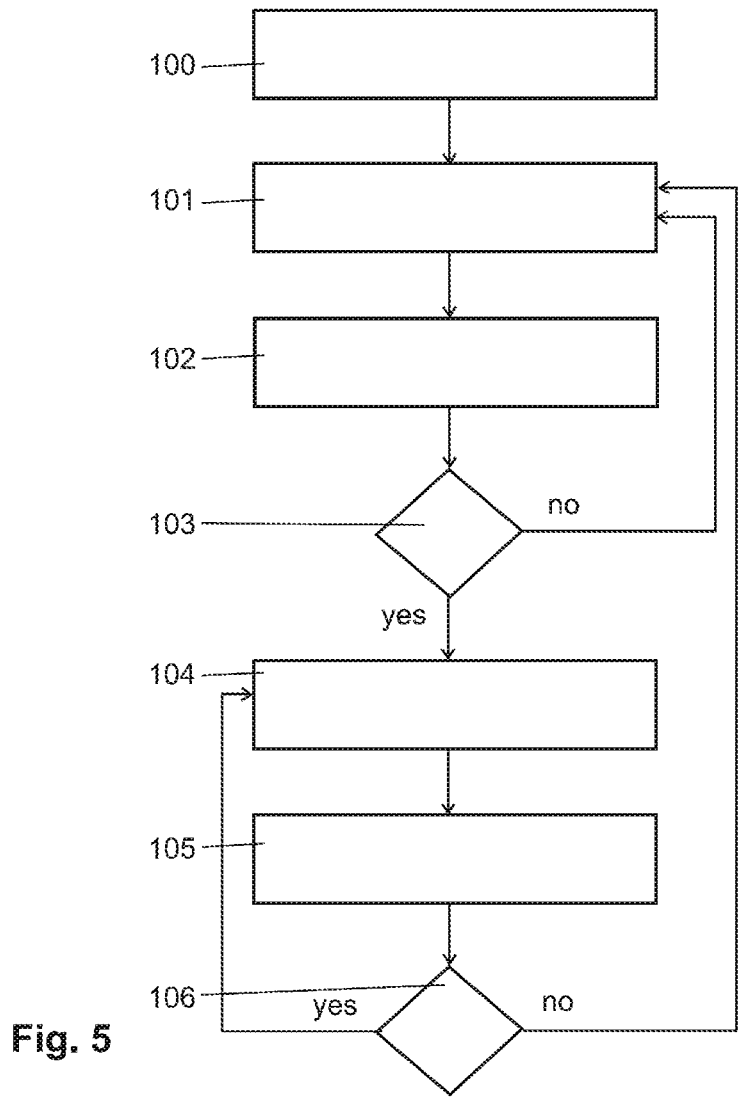

MOSFET DEAD TIME OPTIMIZATION FOR AN ELECTRIC MOTOR OF A STEERING MECHANISM OF A MOTOR VEHICLE

CROSS REFERENCE TO RELATED APPLICATION

This application is a U.S. National Stage Entry of International Patent Application Serial Number PCT/EP2016/070189, filed Aug. 26, 2016, the entire contents of which are incorporated herein by reference.

FIELD The present disclosure generally relates to a method for optimizing dead time of MOSFETs in an inverter of a motor controller of an electric motor in a steering mechanism of a motor vehicle.

BACKGROUND

In an electric power steering apparatus the steering assist force is applied to a steering mechanism by driving an electric motor in accordance with steering torque that is applied to a steering wheel by a driver. An electronic control unit (motor controller) with an inverter controls the motor. The inverter feeds the motor with sinusoidal motor parameters (current, voltage, magnetic flux) for torque generation. The inverter comprises in total six MOSFETs with a low side and a high side MOSFET for each of the three phase windings respectively. Each MOSFET switches the assigned phase winding U, V, W to the on-board vehicle power-supply voltage or the earth potential. This occurs at a high frequency so that the temporal average value acts as the effective voltage in the phase windings U, V, W. The MOSFETs have an intrinsic delay time interval from the receipt of an on or off gate drive signal to the starting up of their switching action. If a delay time between the high side and low side MOSFETs is not sufficiently long to take account of the delays and transients associated with the switching, the control signals to the MOSFETs overlap and cross conduction occurs, which results in an effectively short circuit of the supply. This is also known as a shoot-through condition. In this situation both devices will conduct and hence there will be a low-resistance path between the applied input voltage and ground resulting in noise in the output, lower efficiency and heat generation. Another major problem of short circuit is that it causes current spikes in the collectors of the transistors, which cause failure of the transistors.

To prevent short circuit, a dead time between switching transitions, during which neither MOSFET is turned on, is inserted in the inverter cycle.

It is known to implement a fixed dead time in the inverter. To ensure a safe margin, the typical dead time will be several percent of the drive time, which reduces the efficiency and the range of the inverter. Dead time causes an error voltage between the command voltage and the actual output voltage, thereby resulting in disadvantages such as current distortion and torque ripple.

US 2005/0146311 A1 discloses a dead time compensation method, in which a compensation voltage is applied relative to a current distortion. This adaptive compensation voltage is added onto the command voltage by adjusting PWM duty according to a current phase angle. As a result, the current distortion is compensated in feedback.

Thus a need exists for dead time optimization which limits shoot-through condition and results in higher efficiency of the inverter and therefore better operation during life time.

BRIEF DESRCIPTION OF THE FIGURES

Accordingly, a method for dead time optimization of MOSFETs in an inverter of a motor controller of an electric motor in an electromechanical motor vehicle power steering mechanism or a steer-by-wire system of a motor vehicle is provided, wherein the inverter comprises at least two MOSFETs, namely a high side MOSFET and a low side MOSFET, and wherein the motor controller controls the at least two MOSFETS with gate driver signals with one or more dead times, the dead time representing a time of the MOSFETs for switching over from one MOSFET to another MOSFET connected in series, the method comprises the steps of:

Measuring a cross conduction between a high side MOSFET and a low side MOSFET in a current measurement unit, If a cross conduction occurs: increasing the dead time; otherwise decreasing the dead time.

This adaptive method will set the optimal dead time. If the dead times are too short, no cross conduction will be measured and the efficiency needs to be optimized. Therefore, dead times are decreased. If the dead time is too less, it will cause cross conduction. In this case cross conduction will be detected and the dead time will be set to a higher value. The cross conduction can be measured in form of current spike detection. In this example cross conduction can be defined as the presence of a current above a predefined threshold.

Preferably, at initialization and/or after restart, the at least one dead time is set to a maximum value. The optimization starts from this maximum value and approaches the optimum during operation. Even more preferably, the at least one dead time is varied in a range of a maximum and minimum value obtained in a simulation. Beforehand a worst case simulation can be carried out to obtain the maximum and minimum value, setting the range for the optimization.

In a preferred embodiment, the method comprises further the steps:

Providing a pulse width modulation (PWM) reference signal;

Detecting a cross conduction with the current measurement unit triggered by the PWM reference signal.

In this case synchronization is not needed. The reference signal is used to trigger the method. The reference signal is the PWM gate driver signal of the MOSFETs without dead time.

Preferably, the detection takes place after a predefined time interval following a change in the PWM reference signal.

Since each MOSFET can have a different behaviour, the dead times can be optimized for each pair of high side and low side MOSFETs individually. In particular, each MOSFET can have its own dead time, which is optimized.

However, in particular systems it can be preferred, if the dead times are optimized for all MOSFETs in one process.

For simplicity, it can be advantageous to set the same dead times for the high side MOSFET and the low side MOSFET.

During optimization it is preferred that the dead time is increased and decreased in a predefined time interval or in a predefined time unit. The time interval is preferably in the range between 1 (one) nanosecond (ns) and 1,000 (one thousand) nanoseconds and more preferred between 5 and 50 nanoseconds with an optimum value, in a preferred embodiment, being 10 ns.

In a preferred embodiment the current measurement unit comprises at least one or more shunts, preferably three shunts. The shunt signal is preferably amplified.

For the motor controller it is advantageous, if the inverter consists of in total six MOSFETs with a low side and a high side MOSFET for each of the three phase windings of the electric motor respectively.

Further an electromechanical motor vehicle power steering mechanism for assisting steering of a motor vehicle by conferring torque generated by an electric motor to a steering mechanism is provided, the mechanism comprising:
  a motor controller unit with an inverter comprising at least two MOSFETs, a high side MOSFET and a low side MOSFET, wherein the motor controller unit controls the at least two MOSFETS with gate driver signals with at least one or more dead times, the dead time representing a time of the MOSFETs for switching over from one MOSFET to another MOSFET connected in series,
  a current measurement unit for detecting a current flowing between a high side MOSFET and a low side MOSFET, which is connected to the motor controller unit, wherein the motor controller unit is designed for adapting a dead time for the MOSFETs as a function of the presence of a current detected by the current measurement unit, thereby ensuring that no cross conduction between the high side MOSFET and the low side MOSFET takes place and no excessively long switching pause occurs at the same time.

Preferably, the current measurement unit comprises at least one or more shunts, preferably three shunts. In a preferred embodiment the inverter consists of in total six MOSFETs with a low side and a high side MOSFET for each of the three phase windings of the electric motor respectively.

In FIG. 1 an electromechanical power steering mechanism 1 is schematically illustrated with a steering shaft 2 connected to a steering wheel 3 for operation by the driver. The steering shaft 2 is coupled to a steering rack 5 via a gear pinion 6. Steering rack rods 4 are connected to the steering rack 5 and to steered wheels 30 on the motor vehicle. A rotation of the steering shaft 2 causes an axial displacement of the steering rack 5 by means of the gear pinion 6 which is connected to the steering shaft 2 in a torque-proof manner. Electric power assist is provided through a steering controller 7 and a power assist actuator 8 comprising the electric motor 9 and a motor controller 10. The steering controller 7 in the example receives signals 11 representative of the vehicle velocity v and the torque $T_{TS}$ applied to the steering wheel by the vehicle operator. In response to the vehicle velocity v, the operator torque $T_{TS}$ and the rotor position signal, the controller 7 determines the target motor torque $T_d$ and provides the signal 12 through to the motor controller 10, where the motor currents are calculated via PWM (pulse-width modulation). In addition, as the rotor of the electric motor 9 turns, rotor position signals are generated within the electric motor 9 and provided to the steering controller 7. The electric motor 9 in the example is a permanent magnet-excited motor.

The present invention relates to electric motors in electromechanical motor vehicle power steering mechanisms or steer-by-wire systems of motor vehicles in general.

In the following possible electric motor applications are described which are not limiting. To provide steering assistance, the electric motor 9 can be mounted to the side of the rack housing e.g. driving a ball-screw mechanism via a toothed rubber belt and/or the rack-and-pinion gear system. Further an electric motor can be arranged supporting the rotation of the steering shaft. In steer-by-wire-systems, the electric motor can be part of the feedback actuator.

Figure 2:
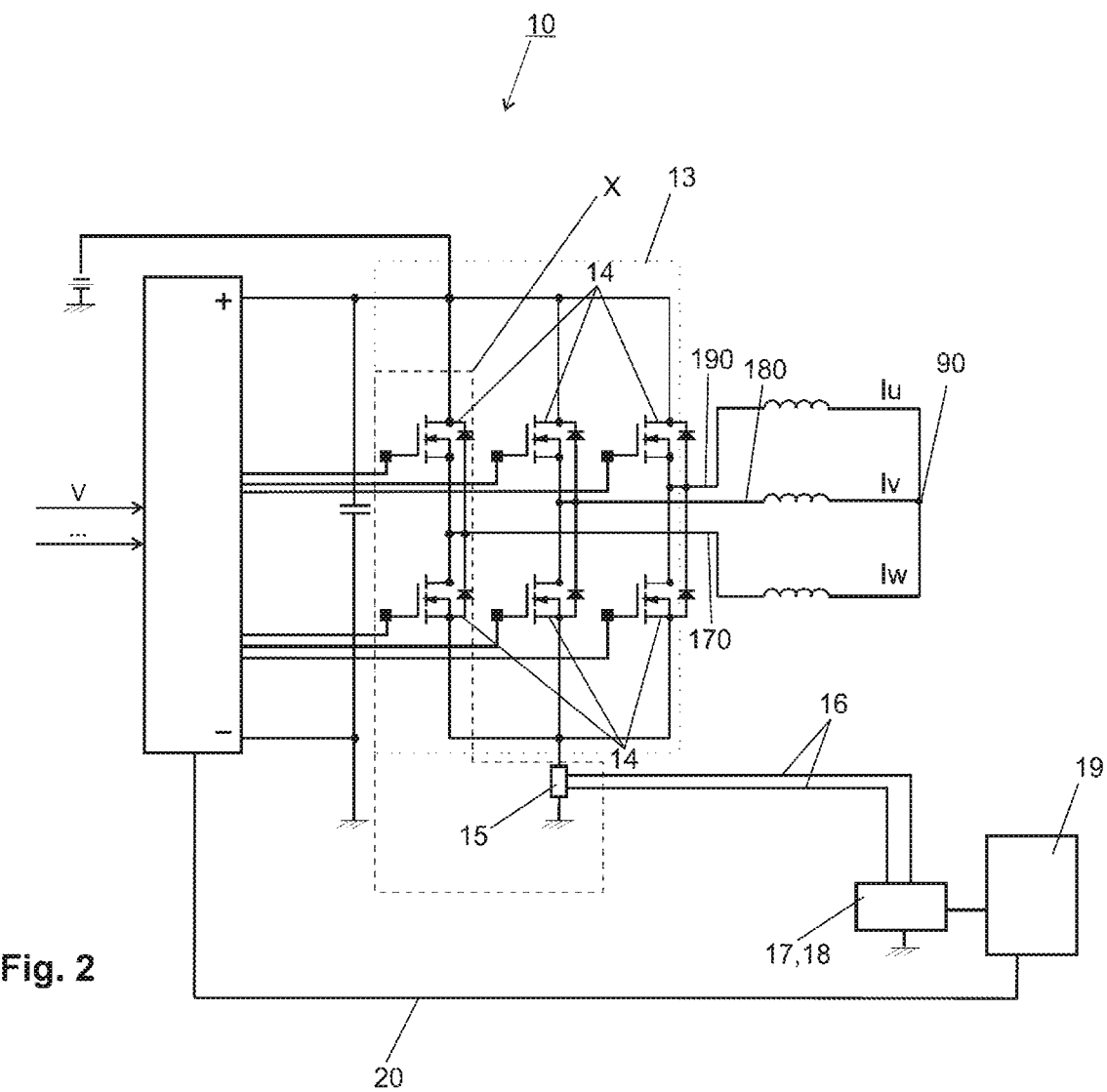

In FIG. 2 an inverter 13 of the motor controller 10 is shown. The inverter 13 transforms voltages into the three-dimensional coordinate system of the electric motor 9 and sensors transform the voltages into motor currents $I_U$, $I_V$, $I_W$. The servomotor 9 is actuated by the control unit 7 via a set of MOSFETs 14, wherein with three phase windings six MOSFETs 14 are provided in total. Each MOSFET 4 switches the assigned phase winding U, V, W to the on-board vehicle power-supply voltage or the earth potential by the three lines 170, 180, 190. This occurs at a high frequency so that the temporal average value acts as the effective voltage in the phase windings U, V, W. The phase windings U, V, and W are connected to one another at a neutral point 90 in a star point of the motor 9. A single shunt 15 on one thread is used to measure the motor currents $I_U$, $I_V$, $I_W$ and possible cross conductions between the MOSFETs arranged in series. The shunt resistor 15 has four wire connections; two for current flow and two for the actual measurement. The output signal 16 is transmitted to a unit 17. An amplifier 18 forms part of the unit 17, which amplifies the output signal 16. The unit 17 is connected to an Analogue-to-Digital Converter (ADC) pin 19 for converting an analogue voltage on a pin to a digital number. The output 20 of the ADC pin 19 is used in a control circuit for the inverter and as current feedback control of the motor currents.

Figure 3:
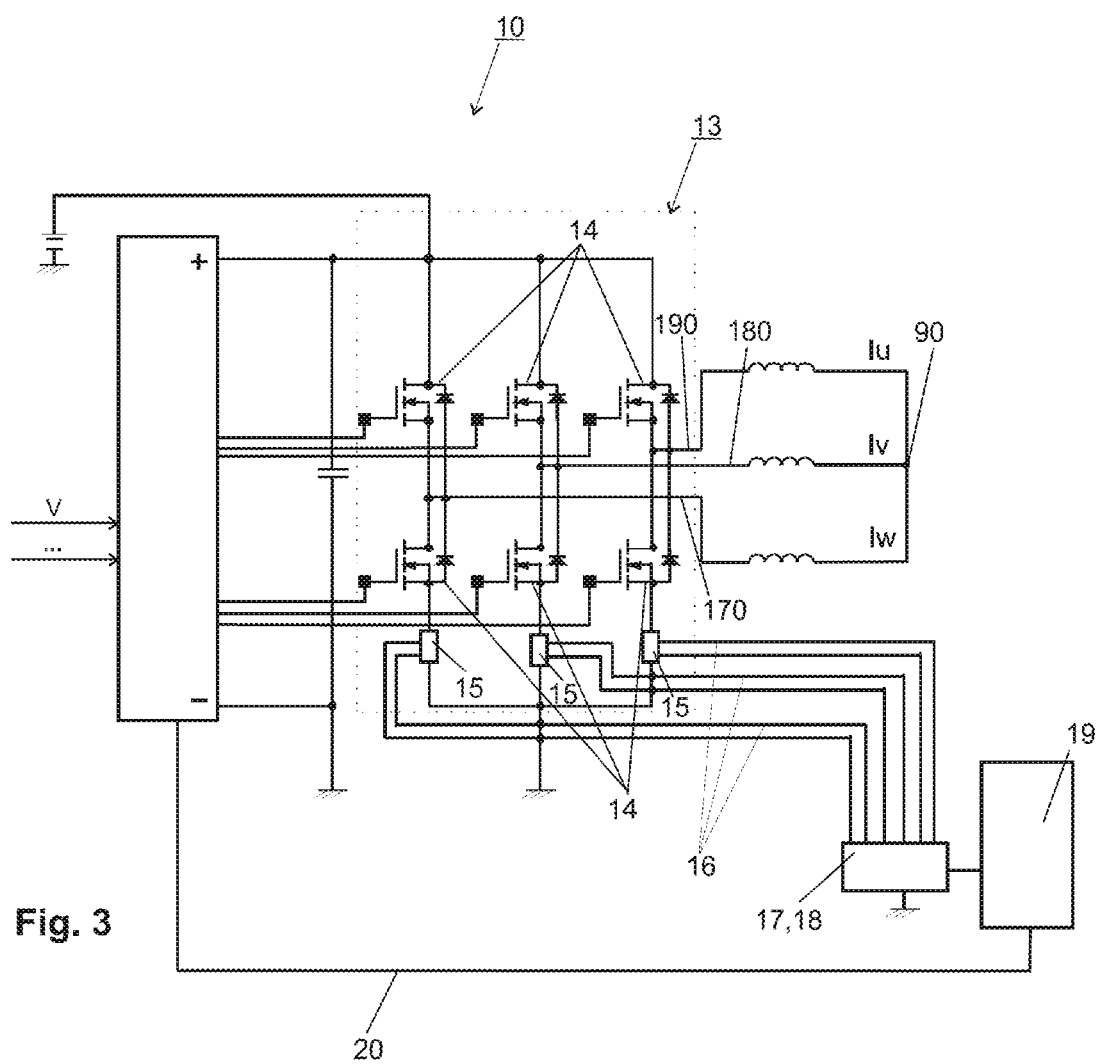

It is also possible, as shown in FIG. 3, to implement three shunts 15, one on each thread to calculate the motor currents and to measure a possible cross conduction between the MOSFETs 14 arranged in series.

FIG. 4 shows the U-phase part X of the inverter 13 on the left side with a high side MOSFET 14' and a low side MOSFET 14". A reference U-phase PWM signal 21 without dead time is shown at the top of the left side. Below this signal, the actual gate driver signals of the U-phase switching elements 14', 14" with dead times are shown. At the bottom the resulting shunt measured cross conduction current signal $I_S$ is shown.

To prevent short circuit between the two gate driver signals 14', 14" dead times Td1 and Td2 are provided, which assure that the ON-state of the transistors do not overlap. The dead times can be generated by gate drivers or by an configurable and manipulated PWM driver, a so called Fast Pulse Width Modulation (FPWM), wherein the driver can read out a parameter table about the dead time. The time to turn off a MOSFET is dependent on the temperature, drive circuit and current. To ensure a safe margin, the typical dead time will be several percent of the drive time, which reduces the efficiency and the range of the inverter. If the dead time is too short the cross conduction causes current spikes 22 in the shunt signal $I_S$ for a short time. The spike is generated in a systematic way, which means that the spike will appear after a certain time following a change in the PWM reference signal. Therefore, the amplifier 18 output is measured after a predefined delay time T1 following a change in the PWM reference signal. These measurement points are fixed. In case that the same motor controller generates the PWM and measures the current spikes, only the delay time T1 is important for timing. Synchronization is then not needed.

If the dead times Td1 and Td2 are too long, no cross conduction will be measured and the efficiency needs to be optimized. Therefore, Td1 and/or Td2 are decreased periodically in small steps. If the dead time is too short, it will cause cross conduction. In this case current spike will be detected and the dead time will be set to a higher value. This adaptive method will set the optimal dead time during the ECU lifetime independent of temperature changes and aging. The result is better efficiency, lower operation temperature and more reliable system with better results.

The flowchart of FIG. 5 shows an optimization method.

In a first initial step 100 the dead time is set to a maximum value obtained in a worst case calculation after cold start. After that the dead time is decreased by a predefined time unit (101). In a third step 102 the signal of the amplifier 18 is measured synchronized to the corresponding PWM reference signal, preferably with a delay of T1 following a PWM signal edge. If a current spike $I_S$ is not detected (103), the dead time will be further reduced in step 101. If a spike is detected (103), the dead time will be increased by one time unit (104). After that the output of the amplifier 18 is measured again (105). If a spike is detected (106), the dead time will be increased by one time unit (101). If a spike is not detected, the dead time will be decreased by one time unit (104). The time unit is preferably in the range of nanoseconds (ns), even more preferably around 10 ns. Thermal parameters will define the scan period.

The calculation of the maximum and minimum dead time value is carried out for a single datasheet. The calculation is based on a simulation with exact values, which depend on the selected components and the design. The motor control unit 10 will vary the dead time in a range set by the worst case simulation calculated maximum and the minimum value.

The method of the present invention helps to increase the efficiency and to lower heat generation in a motor controller. The heat generation has direct impact on the failure rate of the inverter. During the dead time there are voltage spikes on the MOSFET power module phases. Optimal dead time will also reduce the voltage spikes energy. The efficiency is improved because the dead time is always close to an optimum.

What is claimed is:

1. A method for dead time optimization of MOSFETs in an inverter of a motor controller of an electric motor in an electromechanical motor vehicle power steering mechanism or a steer-by-wire system of a motor vehicle, wherein the inverter comprises:
at least two MOSFETs comprising a high side MOSFET and a low side MOSFET, and wherein the motor controller is configured to control the at least two MOSFETs with gate driver signals with a dead time, the dead time representing a time of the MOSFETs for switching over from one of the at least two MOSFETs to another of the at least two MOSFETs connected in series, the method comprising:
measuring a cross conduction between the high side MOSFET and the low side MOSFET in a current measurement unit,
when a cross conduction occurs, increasing the dead time; otherwise decreasing the dead time,
providing a pulse width modulation (PWM) reference signal, being a PWM gate driver signal of the MOSFETs without dead time; and
detecting a cross conduction with the current measurement unit triggered by the PWM reference signal, wherein the detection takes place after a predefined time interval following change in the PWM reference signal.

2. The method of claim 1, further comprising:
setting the dead time to a maximum value at initialization and/or after a restart.

3. The method of claim 1, wherein the dead time is varied in between a range of a maximum and minimum value obtained in a simulation.

4. The method of claim 1, wherein the dead time is optimized for each paired high side MOSFET and low side MOSFET individually.

5. The method of claim 1, wherein dead times are optimized for all MOSFETs at a time.

6. The method of claim 1, wherein dead times for the high side MOSFET and the low side MOSFET are identical.

7. The method of claim 1, wherein the dead time is increased and decreased in a predefined time interval.

8. The method of claim 7, wherein the time interval is in the range between 1 and 1,000 nanoseconds.

9. The method of claim 1, wherein the current measurement unit comprises at least one or more shunts.

10. The method of claim 1, wherein the inverter consists of in total six MOSFETs with a low side MOSFET and a high side MOSFET for each of the three phase windings of the electric motor respectively.

11. An electromechanical motor vehicle power steering mechanism for assisting steering of a motor vehicle by conferring torque generated by an electric motor to a steering mechanism, the mechanism comprising:
a motor controller with an inverter comprising at least two MOSFETs comprising a high side MOSFET and a low side MOSFET,
wherein the motor controller controls the at least two MOSFETs with gate driver signals with a dead time, the dead time representing a time of the at least two MOSFETs for switching over from one MOSFET to another MOSFET connected in series, the motor controller further comprising:
a current measurement unit for detecting a current flowing between the high side MOSFET and the low side MOSFET,
wherein the motor controller is configured to adapt the dead time for the MOSFETs as a function of the presence of a current detected by the current measurement unit, thereby ensuring that no cross conduction between the high side MOSFET and the low side MOSFET takes place and no excessively long switching pause occurs at the same time,
wherein the mechanism is configured to carry out the method of claim 1.

12. The electromechanical motor vehicle power steering mechanism of claim 11, wherein the current measurement unit comprises at least one or more shunts.

13. The electromechanical motor vehicle power steering mechanism of claim 11, wherein the inverter consists of in total six MOSFETs with a low side MOSFET and a high side MOSFET for each of the three phase windings of the electric motor respectively.

* * * * *